United States Patent
Müller

(10) Patent No.: US 10,547,827 B2
(45) Date of Patent: Jan. 28, 2020

(54) METHOD FOR ALIGNING TWO IMAGE RECORDING ELEMENTS OF A STEREO CAMERA SYSTEM

(71) Applicant: Conti Temic microelectronic GmbH, Nürnberg (DE)

(72) Inventor: Gerhard Müller, Bad Waldsee (DE)

(73) Assignee: Conti Temic Microelectronic GmbH, Nürnberg (DE)

( * ) Notice: Subject to any disclaimer, the term of this patent is extended or adjusted under 35 U.S.C. 154(b) by 598 days.

(21) Appl. No.: 14/379,593

(22) PCT Filed: Jul. 15, 2013

(86) PCT No.: PCT/DE2013/200049
§ 371 (c)(1),
(2) Date: Aug. 19, 2014

(87) PCT Pub. No.: WO2014/015867
PCT Pub. Date: Jan. 30, 2014

(65) Prior Publication Data
US 2015/0029313 A1    Jan. 29, 2015

(30) Foreign Application Priority Data
Jul. 27, 2012  (DE) .................. 10 2012 106 834

(51) Int. Cl.
*H04N 13/00* (2018.01)
*B60R 11/04* (2006.01)
(Continued)

(52) U.S. Cl.
CPC .......... *H04N 13/239* (2018.05); *G02B 7/003* (2013.01); *Y10T 29/49133* (2015.01)

(58) Field of Classification Search
CPC .......... H04N 13/0239; H04N 13/0246; H04N 5/2251; H04N 2213/001; G02B 7/003;
(Continued)

(56) References Cited

U.S. PATENT DOCUMENTS 6,029,362 A * 2/2000 Miodragovic ........... B25H 7/00
33/483
6,693,674 B1   2/2004 Wataya et al.
(Continued)

FOREIGN PATENT DOCUMENTS

DE   102005047474   4/2006
DE   102009017742   11/2009
(Continued)

OTHER PUBLICATIONS

International Search Report for PCT/DE2013/200049 dated Nov. 20, 2013.
(Continued)

*Primary Examiner* — Susan E. Hodges
(74) *Attorney, Agent, or Firm* — RatnerPrestia

(57) ABSTRACT

The invention relates to a method for aligning at least two image recording elements of two camera modules of a stereo camera system, in particular with respect to their roll angle relative to one another, as well as to a stereo camera system whose camera modules or image recording elements are aligned in accordance with such method.

6 Claims, 4 Drawing Sheets

(51) Int. Cl.
    *B60R 11/00*     (2006.01)
    *B60R 1/00*     (2006.01)
    *G03B 35/00*     (2006.01)
    *H04N 13/239*     (2018.01)
    *G02B 7/00*     (2006.01)

(58) Field of Classification Search
    CPC .. G03B 17/561; G03B 35/08; Y10T 29/49133
    USPC ...................................... 348/47; 33/600, 613
    See application file for complete search history.

(56) References Cited

U.S. PATENT DOCUMENTS

| | | | |
|---|---|---|---|
| 7,403,709 | B2 | 7/2008 | Miyazaki |
| 7,848,635 | B2 * | 12/2010 | Routhier ................ G03B 17/56 348/47 |
| 8,077,295 | B2 * | 12/2011 | Inagaki .................. B60R 11/04 356/3.14 |
| 8,120,645 | B2 * | 2/2012 | Katahira ................ G03B 35/08 340/436 |
| 8,896,671 | B2 * | 11/2014 | Jayaram ............... H04N 5/2253 348/218.1 |
| 2008/0001727 | A1 * | 1/2008 | Ohsumi ................. B60R 11/04 340/436 |
| 2008/0117316 | A1 | 5/2008 | Orimoto |
| 2010/0259655 | A1 | 10/2010 | Takayama |
| 2011/0050855 | A1 | 3/2011 | Nobis |
| 2011/0255000 | A1 * | 10/2011 | Weber .................... G03B 17/02 348/374 |
| 2012/0081550 | A1 * | 4/2012 | Sewell ................. H04N 5/2251 348/148 |
| 2014/0132739 | A1 | 5/2014 | Ohsumi |

FOREIGN PATENT DOCUMENTS

| | | |
|---|---|---|
| DE | 102010010405 | 9/2011 |
| DE | 102010023591 | 12/2011 |
| JP | H10326886 A | 12/1998 |
| JP | 2006303832 A | 11/2006 |
| JP | 2009265412 | 11/2009 |
| WO | 2006052024 | 5/2006 |
| WO | 2008012173 | 1/2008 |
| WO | 2009057436 | 5/2009 |
| WO | 2011142219 | 11/2011 |

OTHER PUBLICATIONS

German Search Report dated Mar. 22, 2013, in related Application No. DE 10 2012 106 834.8.

Notification of Reasons for Refusal for Japanese Application No. 2015-523422, dated May 12, 2017, including English translation, 9 pages.

* cited by examiner

METHOD FOR ALIGNING TWO IMAGE RECORDING ELEMENTS OF A STEREO CAMERA SYSTEM

CROSS REFERENCE TO RELATED APPLICATIONS

This application is the U.S. National Phase Application of PCT International Application PCT/DE2013/200049, filed Jul. 15, 2013, which claims priority to German Patent Application No. 10 2012 106 834.8, filed Jul. 27, 2012, the contents of such applications being incorporated by reference herein.

FIELD OF THE INVENTION

The invention relates to a method for aligning at least two image recording elements of two camera modules of a stereo camera system, in particular with respect to their roll angle relative to one another, as well as a stereo camera system whose camera modules or image recording elements are aligned in accordance with such method.

BACKGROUND OF THE INVENTION

Driver assistance systems in motor vehicles frequently use a camera system for detecting objects in the vehicle's environment, for example in an environment area located in front of the vehicle in the direction of travel. Such camera systems are typically disposed in the vehicle interior behind the windshield and look in the direction of travel through the windshield.

Some driver assistance systems, such as systems for accident prevention, e.g. (emergency) brake assistants, or systems providing longitudinal or lateral control support, e.g. speed control systems or lane assistants, need information about the vehicle's environment that is as accurate as possible. Detecting objects and determining the distance to these objects play an important part in this respect. Currently, distances to objects are primarily detected by sensors using radiation, e.g. ultrasound, radar, or LIDAR systems. But cameras are also used for determining object distances.

So-called stereo camera systems are used for determining object distances by means of cameras. These consist of two typically identical camera modules or mono cameras designed as separate optical systems, that is, they each comprise an image recording element and an imaging system (e.g. a lens). The two camera modules are mostly aligned with their optical axes in parallel and next to one another at an offset behind the windshield, that is, on a line parallel to the transverse axis of the vehicle. The lateral distance between the camera modules is called the baseline. The coordinates of the projection of one pixel of an object differ in the images captured by the two camera modules. The difference between the pairs of coordinates, that is, the offset of the pixel in the images, depends on the distance of the object from the camera. If the baseline is known, the distance to the object can be calculated from the pixel offset using known trigonometric methods. This principle of determining or calculating object distances using a stereo camera system has also been called the stereo principle.

DE 10 2010 023 591 A1, which is incorporated by reference, discloses a stereo camera system intended for installation on the windshield of a vehicle and for use by a driver assistance system. The system is formed as a mechanically coupled unit of two camera modules. Each camera module of the system includes an image recording element, such as a CMOS or CCD image chip, and a lens system, especially a single lens. The system also comprises an electronic circuit including a memory with a software for evaluating the digital image data generated by the image recording elements of the camera modules.

As described above, the stereo camera system searches for identical image contents, especially pixels, in the two images generated by the two camera modules and evaluates their offset based on the stereo principle to determine distance information. To obtain best possible results and keep the calculation effort as small as possible, the two camera modules or the two image recording elements must be aligned as precisely as possible, especially with respect to their roll angle relative to one another, that is, the rotation of the image recording elements against one another about their respective optical axes. Ideally, the pixel columns of the two image recording systems of a stereo camera system are aligned parallel to one another, i.e. the image recording elements of the camera modules do not have a roll angle or roll angle difference, respectively, relative to one another. For this purpose, the camera modules or image recording elements are currently actively adjusted during the manufacture of the stereo camera system. During the active adjustment, images are read out continuously from the modules while the camera modules are aligned. The images read out can be used to align the camera modules relative to one another.

The currently necessary adjustment of the camera modules of a stereo camera system requires a considerable effort and is cost-intensive. But leaving out the active adjustment step, that is, perform purely mechanical adjustment with sufficiently small tolerances, especially with respect to the roll angle tolerance of the image recording systems, currently fails, especially due to long tolerance chains that exist in the entire stereo camera system but also in individual components of the system, such as the individual camera modules.

The camera modules in known stereo camera systems typically include a mounting plate, e.g. a circuit board on which an image recording element is disposed. A lens system, e.g. a single lens, is located above the image recording element. Said lens may, for example, be held using a lens holder and may also be disposed directly on the mounting plate. The camera modules are manufactured separately and then arranged in the stereo camera system, especially in a common housing of the stereo camera system. The following tolerances regarding the roll angle of the image recording elements of a stereo camera system have to be taken into consideration every time:

- Roll angle tolerance within the image recording element itself, i.e. in particular between the photosensitive semiconductor chip (die) and the chip package (die package)
- Roll angle tolerance between image recording element and mounting plate
- Tolerance between the mounting plate and the lens, especially if features (such as markers) on the lenses of the camera modules are used for roll angle alignment.
- Tolerance between the lens and the lens holder
- Tolerance between the camera modules or between the camera modules and the housing of the stereo camera system, respectively The tolerances within the camera modules of the stereo camera system must each be taken into account for both camera modules, that is, the tolerances will apply twice, which extends the tolerance chain for the entire stereo camera system.

SUMMARY OF THE INVENTION

An aspect of the invention provides a solution for a stereo camera system that makes its manufacture as simple and cost-efficient as possible and in particular makes the roll angle alignment of the camera modules or the image recording elements of the stereo camera system, respectively, as simple as possible. It is preferred that no active adjustment of the camera modules or the image recording elements, respectively, especially no roll angle adjustment, will be required.

An aspect of the invention is to take suitable measures by which a reduction of the tolerances in the stereo camera system and in particular a reduction of the tolerances with respect to the alignment the camera modules is achieved. According to the invention, this is substantially achieved by two measures.

A first proposed measure is to use unpackaged image recording elements, that is, so-called bare die image chips, for the stereo camera system or the camera modules, respectively. These do not comprise a chip package of their own. The roll angle tolerances within the image recording elements, i.e. the tolerances between the photosensitive semiconductor chip (die) and the chip package (die package) are thus eliminated.

Another proposed measure is to provide a defined outer reference edge on the mounting plates of the camera modules. The outer reference edges can in particular be at least one straight outer edge of the mounting plates. It is important that, one, the image recording elements are aligned with these outer reference edges as precisely as possible with respect to their roll angle, especially with their pixel rows and/or pixel columns in parallel to the outer reference edges. This can be done, for example, using one or more stop edges arranged on the mounting plates and aligned parallel to the outer reference edges, especially when using unpackaged image recording elements. It is also essential that the camera modules themselves are aligned relative to one another using the outer reference edges. The camera modules are preferably aligned by positioning the outer reference edges of the mounting plates of the camera modules against a common reference edge, e.g. the same surface or reference surface of a support device which is disposed in the stereo camera system and used for receiving the camera modules.

An advantage of the invention is that the tolerance chain with respect to the roll angle tolerance between the image recording elements of the stereo camera system can be reduced or shortened considerably by the measures described above. When using unpackaged image recording elements and outer reference edges for aligning the image recording elements on the mounting plates and for aligning the camera modules relative to one another, the tolerance chain mentioned at the outset between the image recording elements of a stereo camera system can preferably be reduced to two remaining tolerances:

Roll angle tolerance of the image recording elements relative to the outer reference edges;
Tolerance in the support device for receiving the camera modules in the stereo camera system.

The method according to an aspect of the invention is used to align at least two image recording elements of two camera modules, especially with respect to their roll angle relative to, or against, one another. It is preferred that the camera modules are two camera modules of a stereo camera system in which said camera modules are arranged looking in the same direction at a lateral offset, with their optical axes in parallel position. The method according to the invention substantially comprises the following steps:

Arranging the image recording elements on mounting plates of the camera modules, wherein the image recording elements are each aligned with an outer reference edge of the respective mounting plate, especially with respect to their roll angle;
Arranging the camera modules within the stereo camera system, wherein the outer reference edges of the mounting plates are positioned against a common reference edge or against multiple reference edges that are aligned with one another.

The roll angle of the image recording elements is in particular the rotation of the image recording elements about their optical axis. When aligning the roll angles of two image recording elements relative to one another, it is preferred that the roll angles of the two image recording elements are aligned such that there is no roll angle or roll angle difference, respectively, between the image recording elements of the camera modules, that is, the pixel columns or pixel rows are ideally aligned in parallel position.

The mounting plates of the camera modules on which the image recording elements are arranged and aligned may be made of metal, ceramic, or an epoxy material, for example.

The mounting plates may also be circuit boards with integrated circuits or conductor tracks, or they may be purely passive components such as base plates without an electrically conductive function or without electrical components (circuits, conductor tracks, etc.), i.e. just used to receive the image recording elements and optionally other components.

According to a preferred embodiment of the method according to the invention, the image recording elements are each positioned against one or several stop edges formed on the mounting plates when aligning each of the image recoding elements with at least one of the outer reference edges of the mounting plates, respectively. The stop edges are in particular one or more stop edges formed on the mounting plates and formed or aligned in parallel position to the outer reference edges of the mounting plates. The image recording elements can thus be positioned against the stop edges when they are arranged on the mounting plates and for alignment with the outer reference edges of the mounting plates. This ensures simple and precise alignment of the pixel rows and/or pixel columns of the image recording elements with reference edges, especially in parallel orientation, which dramatically reduces the roll angle tolerance between the respective image recording elements and the respective mounting plate. Alternatively, other positioning methods than positioning the image recording element against one or several stop edges may be used to align the image recording element on the mounting plate with the outer reference edges. For example, alignment can be measured optically, especially with a respective micro-positioning.

According to another preferred embodiment of the method according to the invention, the image recording elements are positioned against one or several stop edges of the mounting plates using one or several elastic elements provided on the mounting plate which apply a spring force onto the image recording elements that forces them against the stop edges when they are arranged on the mounting plate.

According to a special embodiment of the method according to the invention, the image recording elements are each positioned against one or several stop edges of an auxiliary device when aligning each of the image recoding elements with at least one of the outer reference edges of the mounting plates. The auxiliary device preferably is a device that is placed onto the mounting plates for arranging and aligning the image recording elements and removed after completing the arrangement and alignment of the image recording elements. The auxiliary device may for example be designed as a mounting frame having one or several defined stops formed on it with which the frame can be accurately positioned against the outer reference edges of the mounting plates, and comprising one or several stop edges for defined positioning of the image recording element against said stop edges and thus relative to at least one outer reference edge of the respective mounting plate.

According to an advantageous embodiment of the method according to the invention, the image recording elements of the camera modules are unpackaged image recording elements, especially bare dies or bare-die image chips. It is a major advantage of using and arranging unpackaged image recording elements on the mounting plates, especially in conjunction with the method according to the invention, with a defined orientation of the image recording elements relative to at least one outer reference edge of the mounting plates, that the image recording elements can be aligned very precisely with the outer reference edges with respect to their roll angle, since the unpackaged image recording elements themselves have very small roll angle tolerances only. This ensures that pixel rows or pixel columns of the image recording elements can be aligned very precisely, especially in parallel position, relative to the outer reference edges of the mounting plates.

If the image recording elements are unpackaged image recording elements, arrangement on the mounting plates can be such that they are placed on a front side of the mounting plates and bonded to circuit boards, preferably by wire bonding and preferably through recesses in the mounting plates. It is preferred in this case that the circuit boards are disposed on a rear side of the mounting plates.

According to yet another advantageous embodiment of the method according to the invention, especially when the image recording elements are unpackaged image recording elements and the mounting plates of the camera modules are circuit boards, the image recording elements can be arranged on the mounting plate and wire-bonded to the mounting plate.

According to a preferred embodiment of the method according to the invention, the outer reference edges of the mounting plates are positioned against a common reference edge of a support device when arranging the camera modules within the stereo camera system. The support device is preferably a device outside the stereo camera system that is used for receiving the two single camera modules. The support device may for example be a simple beam that serves as a support or as a lateral transverse axis along which the two camera modules are arranged at an offset. The reference edge of the support device preferably is a straight reference edge or reference surface, respectively, of the support device. For performing the method according to the invention, the support device can be formed with a reference edge, such as the upper edge or top surface of a cross member, against which the outer reference edges of the mounting plates of the camera modules are positioned. The reference edge is preferably a common reference edge for both camera modules, that is, both camera modules are preferably arranged or positioned against the same reference edge, especially an edge of the support device that extends along the entire lateral distance (baseline) at which the two camera modules are arranged relative to one another. The camera modules may also be positioned against multiple reference edges of a support device. If the two camera modules are positioned against multiple separate reference edges of a support device of the stereo camera system, it is important that these are aligned with one another, i.e. that they are located in a common plane and/or are aligned in parallel position to one another such that the camera modules can be aligned as precisely as possible with respect to their roll angle relative to one another.

According to another advantageous embodiment of the method according to the invention, the outer reference edges of the mounting plates are positioned against one or several reference edges of an auxiliary device. The auxiliary device preferably is a device that is arranged for positioning the camera modules in the stereo camera system and removed after completing the positioning of the camera modules. The auxiliary device may be a gauge or an auxiliary tool that in particular comprises a common reference edge or multiple separate reference edges aligned with one another, against which the camera modules or outer reference edges of the mounting plates can be positioned when they are arranged in the stereo camera system. The reference edges of the auxiliary device must substantially meet the same requirements as the reference edges on a support device for receiving the camera modules.

The stereo camera system according to the invention includes at least two camera modules, each of which formed with a mounting plate and an image recording element. The camera modules or their image recording elements are preferably aligned using a method according to one of the embodiments described above, especially with respect to their roll angle relative to one another. The image recording elements of the camera modules preferably are unpackaged image recording elements, i.e. bare dies or bare-die image chips. The mounting plates of the camera modules are further preferably designed with at least one outer reference edge positioned against at least one common reference edge of a support device within the stereo camera system.

According to a preferred design of the stereo camera system of the invention, the mounting plates of the camera modules each include one or several cutouts, especially in the form of recesses, for example on the outer edge or on two opposite outer edges of the mounting plates. Furthermore, at least one inner edge inside the cutouts is preferably positioned against at least one reference edge of a support device within the stereo camera system such that the at least one inner edge inside the cutouts serves as an outer reference edge with respect to the method according to the invention for arranging and aligning the camera modules in the stereo camera system and thus for aligning the image recording elements, especially with respect to their roll angle relative to one another.

Alternatively, or in addition to the outer reference edges of the mounting plates, other structural reference features may be formed or provided on the mounting plates that are used for aligning the image recording elements. It is preferred that every time the image recording elements are aligned relative to these features, e.g. using stop edges on the mounting plates, the mounting plates and thus the camera modules themselves are aligned with one another as well by means of said reference features. The mounting plates of the camera modules may for example be formed with one or several holes that serve as reference features of the mounting plates. The holes may be used alternatively or in addition to the outer reference edges of the mounting plates for aligning the image recording elements of the stereo camera system according to the invention and with respect to the method according to the invention.

BRIEF DESCRIPTION OF THE DRAWINGS

Other advantages and optional designs follow from the description and the drawings. Embodiments are simplified in the figures and explained in more detail in the description below.

In the figures.

DETAILED DESCRIPTION OF THE PREFERRED EMBODIMENTS

Figure 1:
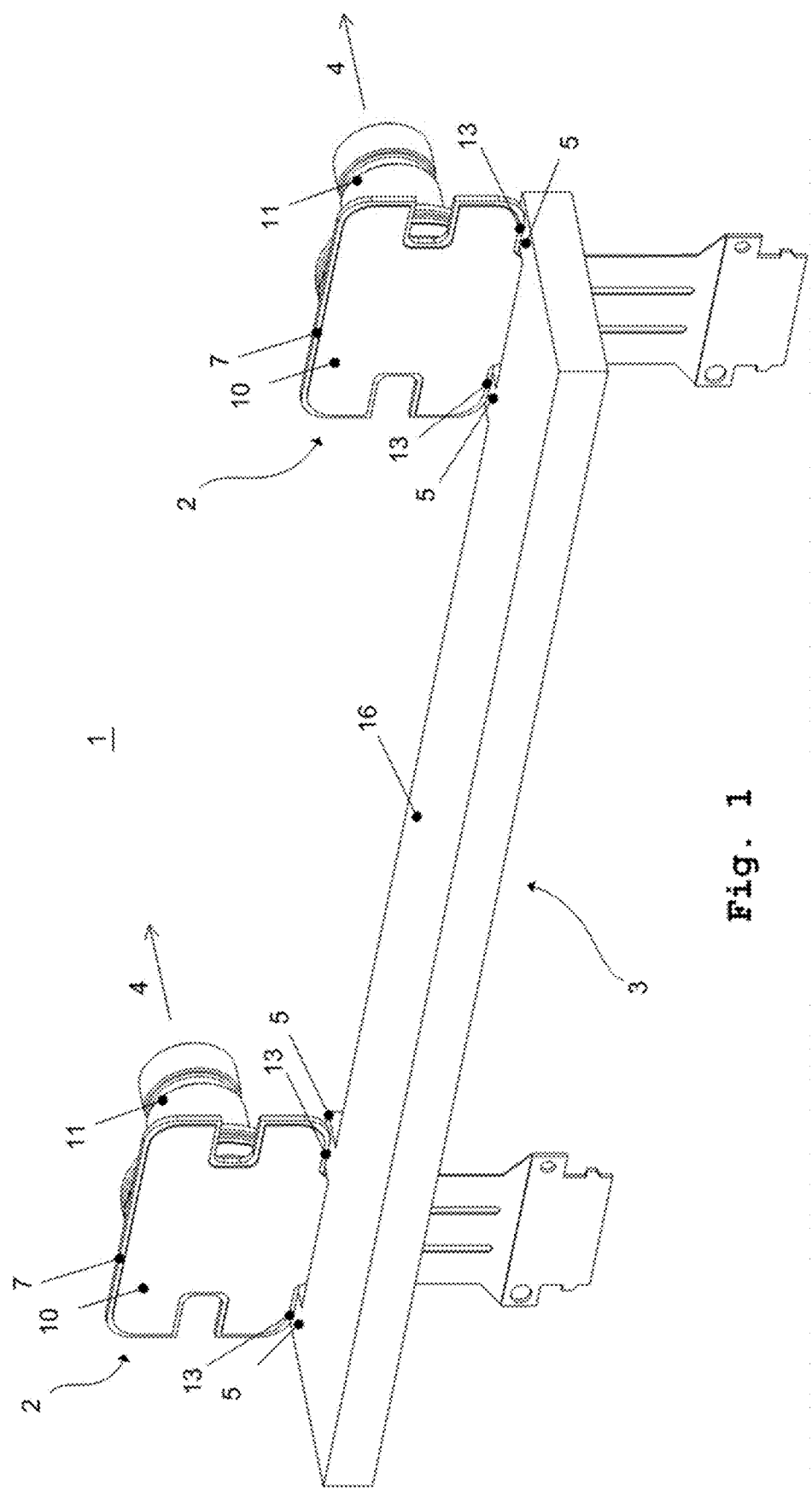
FIG. 1 shows a simplified view of a preferred design of the stereo camera system according to the invention.

FIG. 1 shows a simplified view of a preferred design of the stereo camera system 1 according to an aspect of the invention. The stereo camera system 1 includes two camera modules 2 which are arranged along an auxiliary device 3, which is used for alignment 1 of the camera modules 2, next to one another at a lateral offset and facing the same direction of view 4. The auxiliary device 3 is provided especially for positioning the camera modules 2 in the stereo camera system 1 and is removed after completing the positioning of the camera modules (2). It is preferred that the optical axes of the camera modules 2 are aligned in parallel position to one another. No matter how the auxiliary device 3 is otherwise designed, the auxiliary device 3 includes at least one reference edge 5. The stereo camera system 1 may be a system to be installed in a vehicle. Such a stereo camera system 1 is mostly disposed in the interior of the vehicle behind the windshield and in the direction of view 4 through the windshield. The camera modules 2 are typically arranged on a common line/axis parallel to the transverse axis of the vehicle and next to one another at a lateral offset, their optical axes being aligned in parallel position in the direction of the environment in front of the vehicle. The camera modules 2 of the stereo camera system 1 from FIG. 1 are preferably designed as shown in FIGS. 2a to 2d.

Figure 2A:
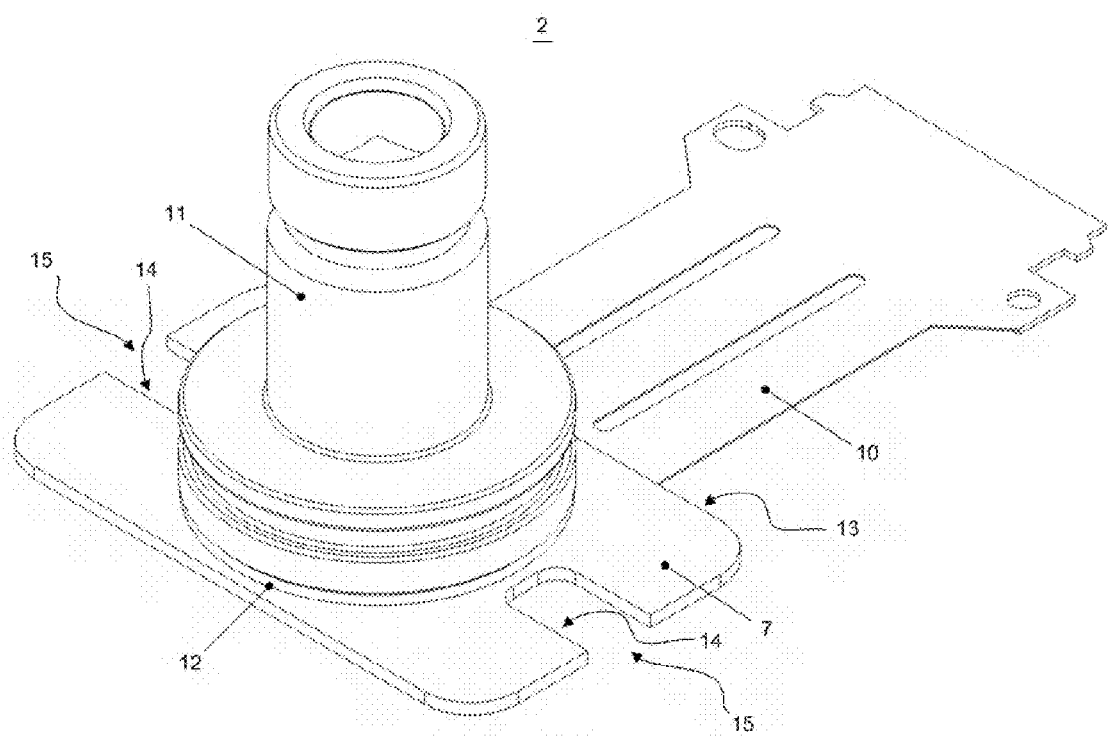
FIGS. 2a to 2d show an advantageous design of camera modules which may be arranged in a stereo camera system using the method according to the invention or which may be arranged in the stereo camera system according to the invention.
Figure 2B:
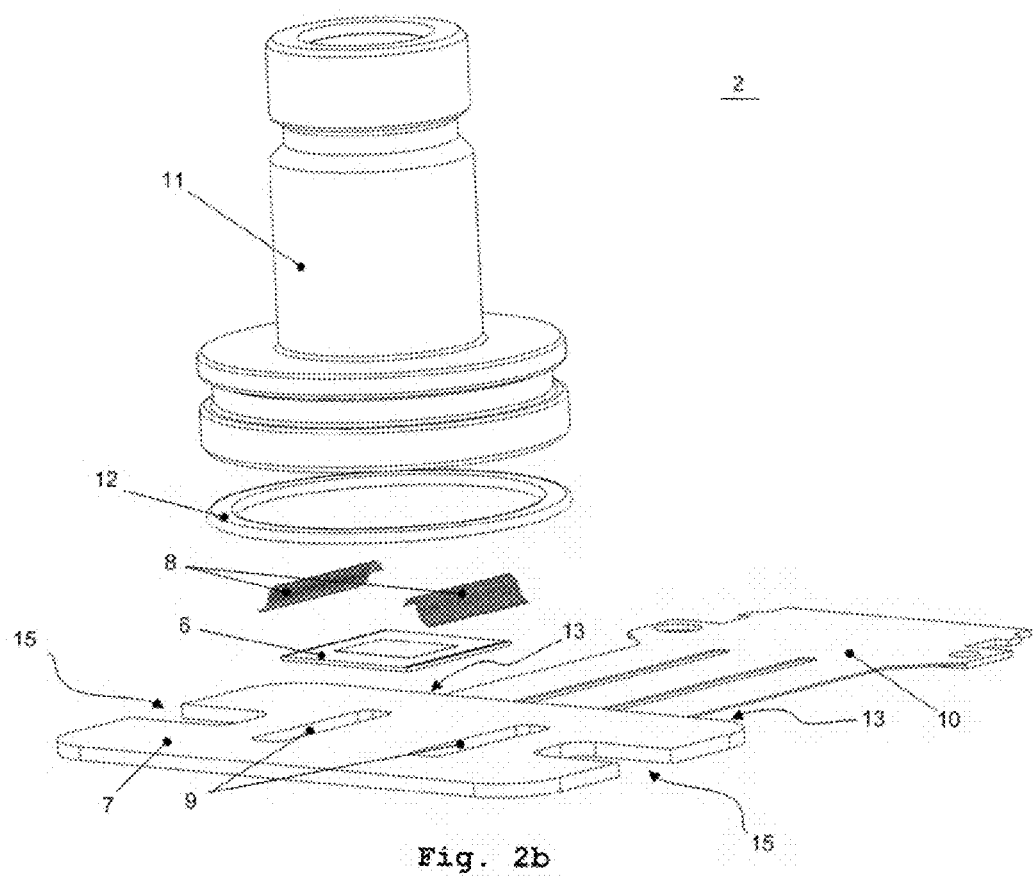
Figure 2C:
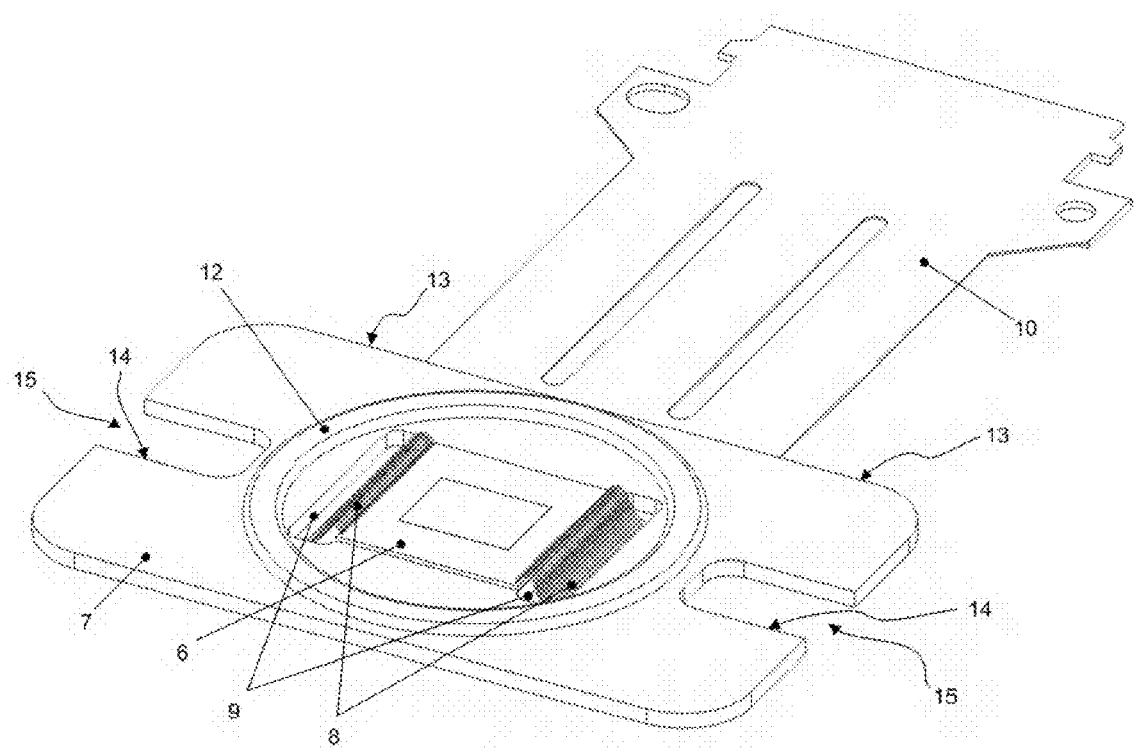
Figure 2D:
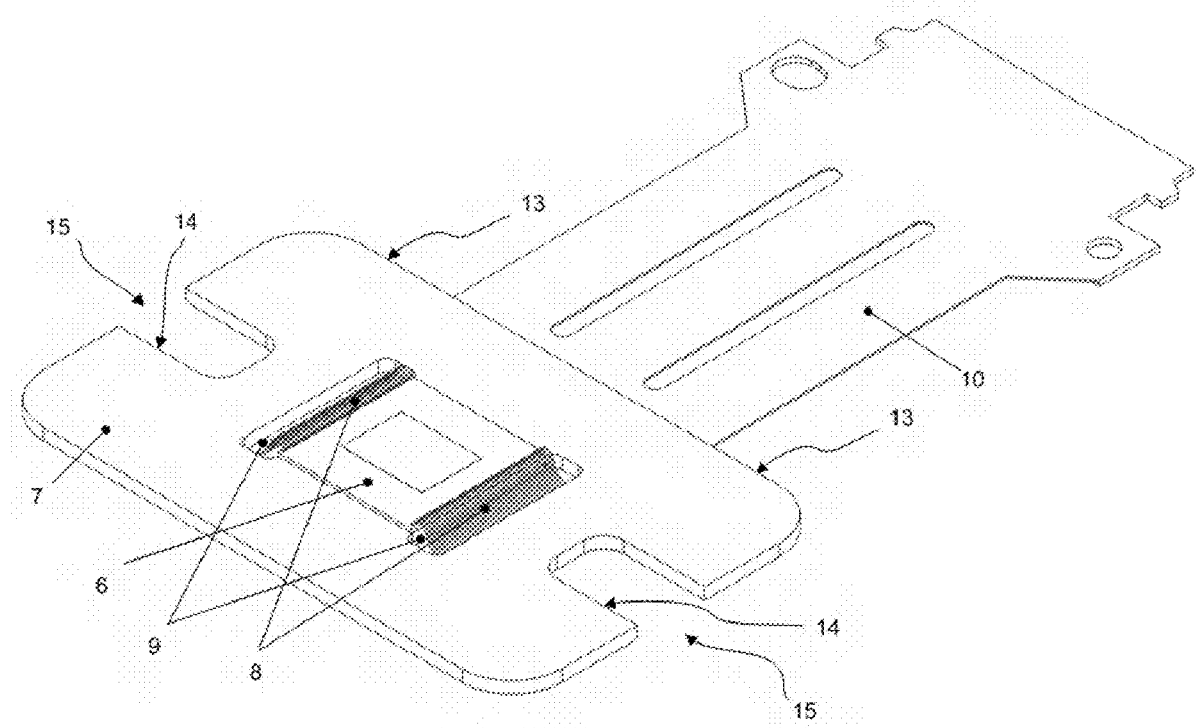

FIG. 2a shows a camera module 2 that may be disposed in the stereo camera system 1 according to an aspect of the invention or that may be arranged in a stereo camera system 1 using the method according to an aspect of the invention. FIG. 2b shows an exploded view of the camera module 2 from FIG. 2a. FIGS. 2c and 2d show the camera module 2 according to FIGS. 2a and 2b, however without showing the single lens 11.

According to FIGS. 2a to 2d, the camera module 2 includes an image recording element 6 that is disposed on a mounting plate 7. The image recording element 6 is preferably disposed on a front side of the mounting plate 7 and electrically contacted using wire bonds 8, especially through recesses 9 in the mounting plate 7, to a circuit board 10 that is arranged on a rear side of the mounting plate 7. The image recording element 6 preferably is an unpackaged image recording element, preferably a so-called bare-die image chip mounted on the mounting plate 7. The carrier plate 7 may be made of metal. The circuit board 10 may for example be a flexible circuit board which carries components required for operating the image recording element 6 and which in particular comprises a contact zone for connecting a zero insertion force connector. Alternatively, an FR4 circuit board could be used as the mounting plate 7. Such a circuit board 10 already comprises a flexible region with contact zones. This would eliminate a two-part solution, i.e. a separate mounting plate and circuit board. The image recording element 6 could be mounted directly on the circuit board. The bond connection 8 would then be made on the same surface on which the image recording element 6 is installed. In contrast, the two-part design with a separate mounting plate 7 and circuit board 10 has the major advantage that it provides very good thermal coupling of the image recording element 6, especially if the mounting plate is a metal plate. Furthermore, a lens 11 of the camera module 2 can be disposed directly on the mounting plate 7, for example by means of an adhesive bond 12. If a lens made of metal is used, the adhesive bond will be made between similar materials, which simplifies the material selection for the adhesive bond 12. Irrespective of whether the mounting plate 7 is designed as a metal plate, a circuit board, or otherwise, the mounting plate 7 includes at least one outer reference edge 13 according to the invention. The outer reference edge 13 could in particular be an inner edge 14 inside a recess or within a cutout 15 in the mounting plate 7. It is in principle possible to use other features alternatively or in addition to using outer reference edges 13, such as holes in the mounting plates 7, to align the mounting plates and thus the camera modules 2 relative to one another.

The stereo camera system 1 from FIG. 1 may for example be disposed in a vehicle behind the windshield with the direction of view through said windshield. Especially when using a stereo camera system 1 in a vehicle and especially if using a stereo camera system 1 according to FIG. 1, for example for obtaining distance or depth information, it is required that the camera modules 2 or the image recording elements 6, respectively, of the stereo camera system 1 are aligned relative to one another as precisely as possible with respect to their spacing, their direction of view 4, and their roll angle. It is preferred that the method according to the invention is used for this purpose, especially for aligning the roll angles of the image recording elements 6 relative to one another.

According to the method of an aspect of the invention, the camera modules 2 or the image recording elements 6, respectively, are aligned, especially with respect to their roll angle, by performing the following steps:

Arranging the image recording elements 6 on the mounting plates 7 of the camera modules 2, wherein the image recording elements 6 are each aligned with the respective outer reference edges 13 of the mounting plates 7, especially with respect to their roll angle;

Arranging the camera modules 2 within the stereo camera system 1, wherein the outer reference edges 13 of the mounting plates 7 are positioned against the reference edges 5 of the support device 3.

A key aspect of the invention is to take suitable measures that result in a reduction of the tolerances within the camera modules 2 of the stereo camera system 1, and in particular a reduction of the tolerances with respect to aligning the camera modules 2 relative to one another and thus a reduction of the entire tolerance chain of the stereo camera system 1, especially with respect to the roll angle alignment of the image recording elements 6.

A first proposed measure is to use unpackaged image recording elements 6 for the stereo camera system 1 or the camera modules 2, respectively. This eliminates the roll angle tolerance within the image recording elements 6.

Another proposed measure is to provide a defined outer reference edge 13 on the mounting plates 7 of the camera modules 2. On the one hand, the image recording elements 6 are aligned in this process with said outer reference edges 13 as precisely as possible with respect to their roll angle, especially with their pixel rows and/or pixel columns parallel to the outer reference edges 13. On the other hand, the camera modules 2 themselves are aligned by means of said outer reference edges 13 in a second step of the process. The camera modules 2 are preferably aligned by positioning the outer reference edges 13 of the mounting plates 7 of the camera modules 2 against one common reference edge or several reference edges 5 aligned with one another, which are preferably in one plane, that is, they are arranged on a common reference surface 16 of the support device 3 of the stereo camera system 1.

The measures described above result in a considerable reduction or shortening of the tolerance chain of the entire stereo camera system 1 with respect to the roll angle tolerance between the image recording elements 6. When using unpackaged image recording elements 6 and outer reference edges for aligning the image recording elements on the mounting plates 7 and for aligning the camera modules 2 relative to one another on reference edges 5, the tolerance chain can preferably be reduced to two remaining tolerances:

Roll angle tolerance of the image recording elements 6 relative to the outer reference edges 13;

Tolerance in the support device for receiving the camera modules 2 in the stereo camera system 1.

LIST OF REFERENCE SYMBOLS

1 Stereo camera system
2 Camera module
3 Auxiliary device
4 Direction of view
5 Reference edge
6 Image recording element
7 Mounting plate
8 Wire bonds
9 Recess
10 Circuit board
11 Lens
12 Adhesive bond
13 Outer reference edge
14 Inner edge
15 Cutout
16 Reference surface

The invention claimed is:

1. A method for aligning at least two image recording elements of two camera modules of a stereo camera system, comprising:
   arranging the image recording elements on mounting plates of the camera modules with a surface of each image recording element facing a surface of the respective mounting plate, the surface of the respective mounting plate bounded on one or more sides by at least one outer reference edge, wherein the image recording elements are each aligned with the respective at least one outer reference edge of the respective mounting plates;
   arranging the camera modules within the stereo camera system, wherein the outer reference edges of the mounting plates are positioned in direct contact with a common reference edge of an auxiliary device or against multiple reference edges of the auxiliary device that are aligned with one another, the mounting plates formed separately from the auxiliary device; and
   removing the auxiliary device after completing the arrangement of the camera modules within the stereo camera system.

2. The method according to claim 1, wherein when aligning the image recording elements with at least one outer reference edge of the mounting plates, the image recording elements are each positioned against one or several stop edges formed on the mounting plates.

3. The method according to claim 2, wherein the image recording elements are positioned against the one or several stop edges of the mounting plates using one or several elastic elements which are formed on the mounting plates and apply a spring force onto the image recording elements that forces them against the stop edges when they are arranged on the mounting plate.

4. The method according to claim 1, wherein when arranging the image recording elements on the mounting plates, the image recording elements are arranged on the mounting plates as unpackaged image recording elements.

5. The method according to claim 1, wherein the image recording elements are arranged on a front side of the mounting plates and contacted to circuit boards arranged on a rear side of the mounting plates using wire bonds through recesses in the mounting plates.

6. The method according to claim 1, wherein the mounting plates are circuit boards, and the image recording elements are contacted to the mounting plates using wire bonds.

* * * * *